United States Patent [19]

Borgersen et al.

[11] Patent Number: 5,788,545
[45] Date of Patent: Aug. 4, 1998

[54] TRIM ANGLER SENSOR TRANSMISSION FOR A MARINE DRIVE

[75] Inventors: Kjell Borgersen, Myggenas, Sweden; Kent Lundgren, Virginia Beach, Va.

[73] Assignee: Volvo Penta of the Americas, Inc., Chesapeake, Va.

[21] Appl. No.: 867,358

[22] Filed: Jun. 2, 1997

[51] Int. Cl.⁶ .................................................. B60L 1/14
[52] U.S. Cl. ................................................ 440/2; 440/53
[58] Field of Search .......................... 440/2, 6, 53, 57, 440/58, 59; 114/144 E; 340/689, 987; 324/207.25

[56] References Cited

U.S. PATENT DOCUMENTS

| | | | |
|---|---|---|---|
| 3,203,390 | 8/1965 | Boda | 440/2 |
| 3,931,784 | 1/1976 | Collis et al. | 440/2 |
| 4,364,733 | 12/1982 | Lohner. | |
| 4,652,878 | 3/1987 | Borgersen. | |
| 4,741,713 | 5/1988 | Ohlsson et al. | |
| 4,865,568 | 9/1989 | Koike | 440/2 |

*Primary Examiner*—Stephen Avila

[57] ABSTRACT

Trim angle sensor transmission for a marine drive arranged between a drive input and a drive output. The transmission has a rotatable input member (22) being rotatable between the angular trim limits of a marine drive, and is connected to an input (31) of a rotational output sensor (30) for detecting an angle of rotation of the input member. The output sensor (30) has electrically rotational limits which are wider than the angular limits of trimming. The transmission has a planetary gear drive including an annulus (26), a sun wheel (29), at least one planet wheel (25) and a planet carrier (24). The annulus (26) is fixed, the input member (22) is connected to the planet carrier and the sun wheel is connected to the output sensor (30), in such a way that the planetary gear drive gives a multiplication of the trim input to the output sensor (30).

14 Claims, 2 Drawing Sheets

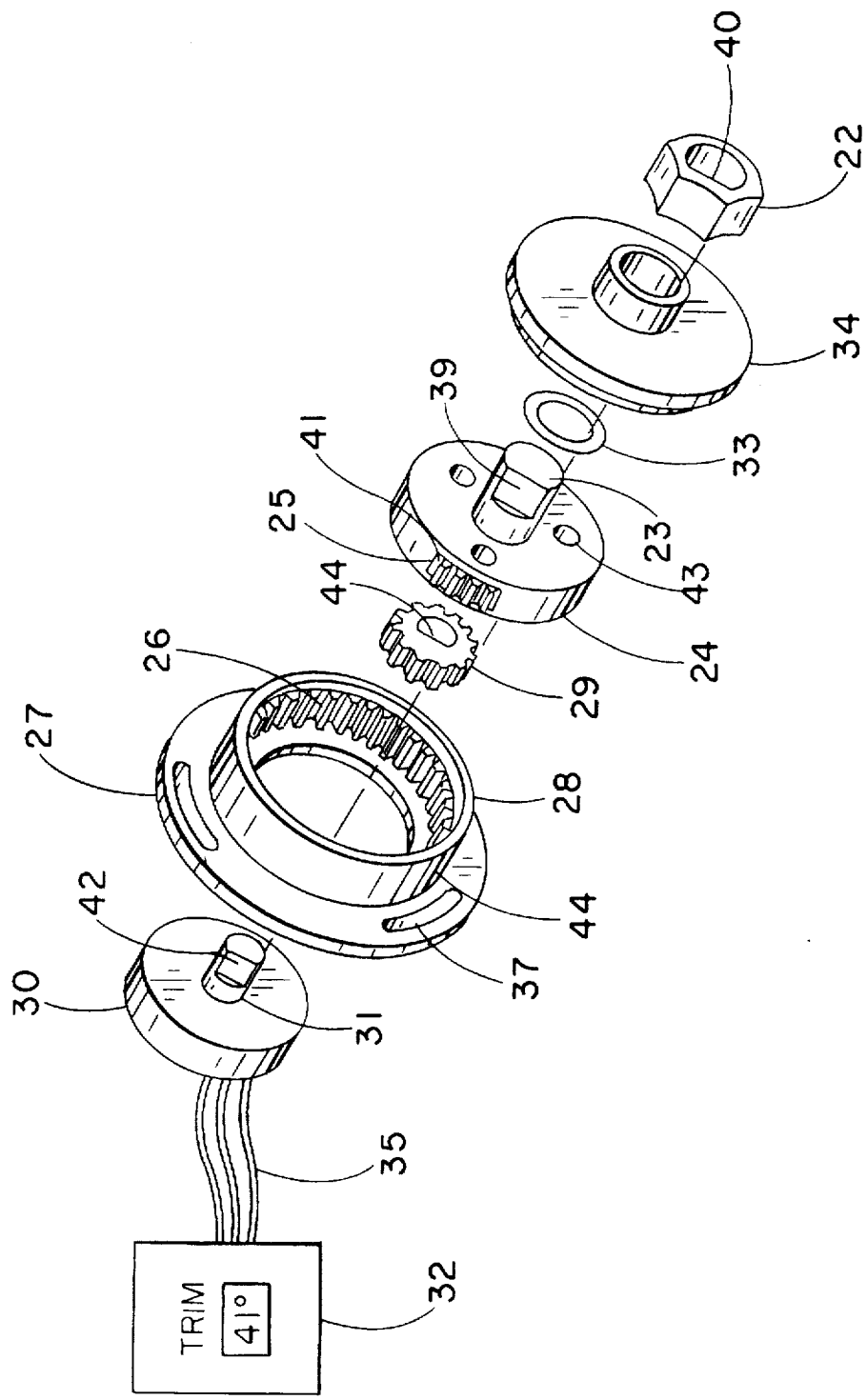

TRIM ANGLER SENSOR TRANSMISSION FOR A MARINE DRIVE

FIELD OF THE INVENTION

The present invention relates to a trim angle sensor transmission for marine drives, in which the sensor transmission has a rotatable input member for transmitting a rotational trimming input, whereby the input member is rotatable between the angular trim limits of a marine drive and wherein the input rotation is transmitted to an output which can be connected to a display device.

BACKGROUND TO THE INVENTION

It is known in the field of marine drives and in particular marine propeller drives, that the trim angle of a boat can be altered by altering the trim angle of the propeller and its supporting structure in a vertical plane. Typically, the trim angle variations of the propeller lie within an angular range of about 55°.

When trimming the propeller, it is desirable to know the trim angle which has been used, such that optimal trim angles for particular boats in particular water and weather conditions can be set and recorded for later use if required. For example, when cruising in still waters at a certain speed there will normally be a particular trim angle which is best for a particular boat and drive combination. In order for the boat driver to set the trim angle, it is known to use sensor transmissions whereby the shaft, about which the trim angle is effected, acts on a rotational potentiometer so as to provide an indication of the input trim angle. Such an arrangement is known from U.S. Pat. No. 4,364,733 for example.

The working angular range of a rotational potentiometer is typically between approximately 320° working range up to 350° working range (i.e. an electrical rotational angle of between 0° to 320° and 0° to 350°). Thus, the range is only partially used since the trim angle limits lie within only about one fifth of this range. Consequently, the sensitivity of the potentiometer which is set to operate over its full working range is such that it is extremely difficult, and in most cases impossible, to obtain an accurate or reliable reading. This results in difficulty for the driver in determining the actual trim angle. This difficulty is further exaggerated when two or more drive units are used, since trying to set each drive unit to the same trim angle based on the readings obtained is very unreliable.

The trim angle can be displayed on a display unit of analogue or digital type (see e.g. U.S. Pat. No. 4,652,878). Digital displays (e.g. LCD displays) are preferred where possible, since the boat driver can set a particular digital reading of trim angle. However, the angular reading obtained from such displays is totally dependent on the sensitivity of the trim output sensor working within a small angular range, and this generally leads to fluttering or varying readings as the driver tries to set and maintain the trim angle of one or more propeller drive units. This is disturbing for the driver and leads to a lack of reliance on the trim angle readings.

One solution to this problem is discussed in U.S. Pat. No. 4,741,713, which discloses a tiltable yoke (known also as a "gimbal ring") and steerable drive unit arrangement within this yoke, whereby an arc-shaped toothed segment attached to the drive unit housing, and thus following its movements, engages a gear wheel supported for rotational movement about a vertical shaft. The shaft, in turn, is arranged in a central bore of an upper support shaft (the so-called "steering shaft"). Movement of the toothed segment is multiplied by the gearing ratio between the segment and the gear wheel so as to use the whole potentiometer range. Such an arrangement is suitable for pivotable yokes, since sufficient space is available to arrange the gearing in this way. Although this arrangement also has the advantage that the electrical connection to the rotary potentiometer can be positioned inside the boat transom, the upper steering shaft, which is required to support high loads, must however itself be adapted with a central through-bore having differing and, at its upper end very wide, bore diameters along its length. The provision of a varying diameter through-bore in the steering shaft, apart from implying extra machining, however also causes it to be weakened.

Similarly in U.S. Pat. No. 4,364,733, the arrangement requires the use of specially prepared hollow stub shafts or gimbal bearing arrangements.

The object of the present invention is to provide a simplified self-contained transmission arrangement for transmitting the trim angle value to an output sensor, allowing use of the whole angular range of the output sensor (e.g. potentiometer) and without resorting to unnecessary machining. In particular, the present invention is particularly aimed at providing a transmission which is suitable as an add-on extra to existing equipment, in not only inboard-outboard units as in U.S. Pat. No. 4,741,713 but also for purely outboard units for example.

A further object of the invention is to provide a transmission device which is robust, yet particularly compact in the width direction of said device, so as to allow fitting into short (e.g. of the order of a few centimeters) axial spaces.

The present invention also has the further object of providing a sensor transmission system allowing the reliable use of a digital display for providing a stable and accurate indication.

SUMMARY OF THE PRESENT INVENTION

In order to meet the aforesaid objects, a transmission is provided which can be fitted to a shaft member, or the like which is located at the horizontal pivot axis, thus allowing direct transmission of the trim angle rotational input to the input of the transmission and through this directly to the output sensor. The transmission of the invention comprises a planetary gear drive including a fixed annulus, a sun wheel, at least one planet wheel and a planet carrier. The input member is connected to the planet carrier and the sun wheel is connected to the output sensor, whereby the planetary gear drive is arranged to provide a multiplication of said rotational input from said input member to said output sensor.

As will be clear from the following, all that is required for adding the device to an existing drive unit support system is access to one end of a shaft, stub shaft, or the like, which rotates with the marine drive unit when it is to be pivoted for the purposes of trimming, so as to provide the direct rotational input. The stub shaft may have a simple, single diameter axial bore on its outer side for example, to provide a simple connection location for the sensor transmission, said bore being positioned in a non-heavily loaded part of the shaft.

BRIEF DESCRIPTION OF THE DRAWINGS:

An embodiment of the invention will now be described with reference to the accompanying drawings in which:

FIG. 2 depicts one embodiment of the transmission of the present invention in an exploded view.

Figure 1:
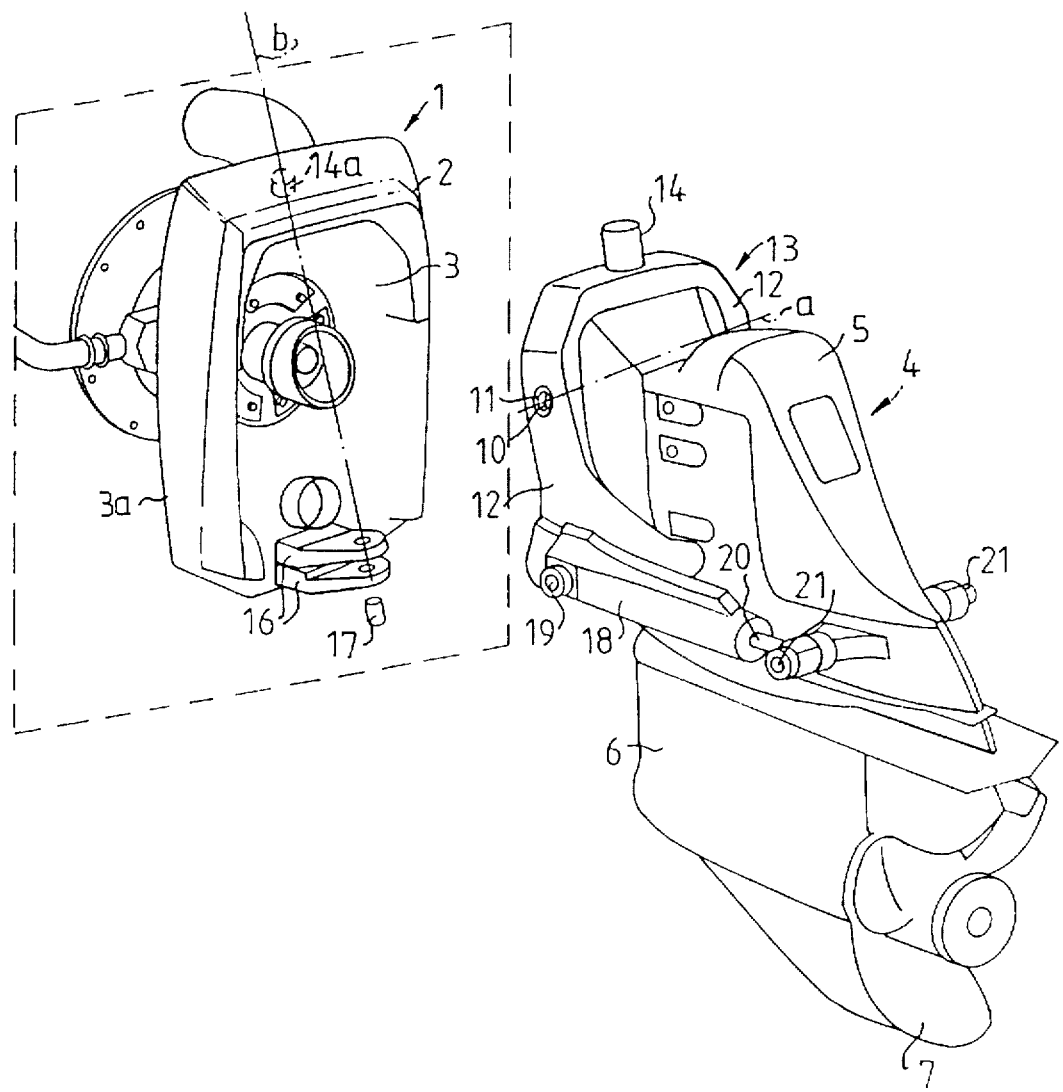
FIG. 1 depicts a marine drive unit of the steerable yoke type, suitable for use with the transmission of this invention.

DETAILED DESCRIPTION OF PREFERRED EMBODIMENTS:

In order to more clearly understand the background to the present invention, FIG. 1 shows a marine drive unit and support system therefor, to which the device of the present invention may be fitted.

The drive unit depicted is of the so-called Aquamatic® type and comprises a carrier 1 which has a frame portion 2 intended to be fixed to the transom of a boat with its surface 3a in sealing contact with the edge of an opening in the transom. The frame portion 2 is cast in one piece with the cover 3 lying inside it which, when the carrier 1 is mounted, extends into the opening in the transom, and to which the engine flywheel cover is securely bolted.

The drive unit also comprises a propeller rig 4 having an upper gear housing 5 and lower gear housing 6 containing the propeller shaft for propeller 7. The upper gear housing 5 has a pair of trunnions 10 pivotally mounted in openings 11 in opposite legs of support yoke 13. This arrangement of trunnions 10 and support yoke 13 allows pivoting of the rig (i.e. drive unit), as explained further below, relative to the yoke 13 about a substantially horizontal pivot axis "a". This pivotal movement about axis "a" is how angular trimming of the drive unit propeller is effected.

The yoke 13 has an upper stub shaft 14 for mounting the yoke 13 in a bearing 14a in the upper part of the frame cover 3. A steering arm (not shown) is fixed to an upper portion of the stub shaft 14 which extends through the cover 3. The legs 12 of the yoke are joined at their lower ends to each other by means of a transverse beam (not shown) which, when the drive unit 4 is suspended in the frame 1, lies in the space between the two flanges 16 on the frame portion 2 of the carrier. A pin 17 extends through an opening in the transverse beam and is fixed in the flanges 16. The central longitudinal axis of the pin 17 is aligned with stub shaft 14 to form steering axis "b" of the drive unit 4.

A pair of hydraulic cylinders 18, 20 are arranged one on either side of the gear housing 5. The cylinders 18 are pivotally connected to pins 19 while the piston rods 20 are pivotally connected to pins 21 on the upper gear housing 5. With the aid of the devices 18, 20, the trim angle of the drive unit relative to the boat can be adapted to the running conditions of the boat, by effecting pivoting of the drive unit around axis "a". When stationary, the devices 18, 20 are used to tilt the lower gear housing and the propeller out of the water. Since the cylinders 18 are attached to the yoke 13, they will follow the steering movements of yoke 13.

FIG. 2 shows an embodiment of the trim angle sensor transmission according to the invention. An input member 22 in the form of, for example, a hard rubber nut or sleeve, is arranged at the far right hand side as depicted. Said input member is designed for connection to one end of a pivot shaft (not shown) or inside one of the trunnions 10 (see FIG. 1) forming, or in line with, the pivot axis "a". The input member may be attached in any suitable manner to the trunnion 10 from the outside, for example by being pushed with an interference fit over its end or even by adhesive. However, where the input member is in the form as shown in FIG. 2 using a hard rubber nut, the outer nut connection surfaces may be fitted inside the end of a trunnion with a strong interference fit such that movement of the shaft will cause accurate corresponding movement of the rubber nut. The trunnion or stub shaft may also be formed differently at its end to provide the required connection, such as with an inner end surface shaped in the form of a hexagonal socket into which nut 22 can fit. Also, alternative forms of connection devices other than a rubber nut can be used.

The input member 22 is connected at its other side to a stub shaft 23 which projects through a cover member 34. Since the stub shaft may be formed with a flat surface 39 thereon, a suitable means of attachment is by providing a corresponding flat 40 on the inner surface of member 22. The attachment of the two elements 22 and 23 preferably form an interference fit when fitted together, such that no play arises between these. In order to achieve such characteristics, the member 22 is preferably made from hard rubber, such as rubber having a shore hardness of 50°.

Stub shaft 23 is attached, or integrally formed with, a housing member which constitutes a planet carrier 24 of a planetary gear drive. In the shown embodiment, the carrier 24 has three shafts 43 therein, each supporting one planet gear 25, each of which is open for engagement externally through openings 41. In the centre of the planetary drive there is a sun wheel which is arranged concentrically with the axis of rotation of stub shaft 23. The sun wheel engages with each of the planet gears 25.

An annulus housing member 27 having an attachment flange 28 is formed, or fitted, with an annulus gear 26 internally thereon. Said annulus 26 engages with each of the planet wheels 25. An output of the transmission is taken via the input shaft 31 of a rotary potentiometer 30, the input shaft 31 being connected to the sun wheel and held in fixed engagement therewith by corresponding flats 42 and 44 on the potentiometer shaft 31 and sun wheel 29 respectively. A typical outer diameter dimension of the annulus housing would be of the order of 6 cm for example, although other dimensions could be used depending on the application.

Electrical conductors 35 lead from the potentiometer 30 to a display device 32, preferably a digital display device, positioned suitably inside the boat.

In order to provide a water-tight seal between the input side of the transmission and the annulus housing 27, the cover 34 is sealed around its periphery to said housing. Where plastics are used for the housing 27 and cover 34, ultrasound welding is suitable for this purpose, although adhesives or rubber-sealed connections might also be used for example. Most preferably, the whole transmission unit will be made from plastics. Additionally, the rotatable shaft 23 must be sealed with respect to the stationary cover 34 to prevent water ingress. Such a seal can be achieved for example by an O-ring 33 sealing between casing 24 and cover 34.

Due to the aforementioned structure, the unit can be made particularly short in its axial length, allowing it to fit, for example, in the limited space provided in the openings 11 (see FIG. 1) on the outside of the yoke 13.

As will be clear, the arrangement can be fixed to the outside of the yoke by means of an attachment flange 28 integral with annulus housing 27 with the annulus hub 44 fitted in said opening and the attachment flange external to this. For this purpose, curved slots 37 are provided, through which fastening screws (not shown) may be fitted. The casing of the potentiometer itself will also require a water-tight seal to the annulus housing/flange and this can be achieved for example by use of sealing compound (e.g. silicon—not shown in the figures), or by another type of sealing arrangement. The sealing compound and/or another connection means should also be such that the potentiometer body does not rotate with respect to the annulus housing.

The slots 37 (preferably two, and more preferably three or more) provide an adjustment means for the potentiometer so that it can be rotated within a limited arc to provide a zero (or other) reading on the display device for a zero (or other) trim angle. A suitable arc angle for the slot would be 15° for example, although different angles, for example up to 90° could be chosen.

The gear ratio of the planetary drive between input 22 and output 29, 31, is chosen such that the limited angular range of trim movement (typically about 55°, but possibly up to 65° or more) can be multiplied into substantially the whole range of the potentiometer which will have a wider rotational range typically of between 0° to 300°–350°, for example 0° to 320°. Thus a transmission gear ratio of between 4:1 and 7:1 is suitable, preferably about 6:1.

A reliable resolution of 0.50° tilt angle on the display 32 will therefore be readily achievable, since this corresponds to about 3° of potentiometer rotational input movement, which is a reliable sensitivity limit for present day rotary potentiometers of this size.

The gearing itself is a gearing which is robust in its construction since all gears are engaged on more than one point around their periphery and thus, the device can be made of thin plastics, without any significant risk of failure due to vibrational or cantilever forces. A nylon-based plastic would be suitable for example. This allows the device to be light and particularly compact. In this regard, a total length of the sensor transmission from the rear face of rotary potentiometer 30 to the front end of stub shaft 23 of between 3 and 4 cm is easily achieved, thus allowing the sensor transmission to be fitted into short axial spaces.

The depicted embodiment in FIG. 2 can be easily applied to all trim altering devices for marine use, merely by taking the output directly from a rotatable point (e.g. the tilt shaft). Thus, although the invention has been described as being applied to an steerable yoke drive unit, it can equally be applied to a pivotable yoke unit, although access to the tilt pivot for a direct drive is suitable. Similarly, the invention can be applied not only to inboard-outboard drives (i.e. with internal motor and external drive) but also to entirely outboard motor arrangements.

As a result of the reliable resolution that can now be obtained in the readings of the display device due to the larger potentiometer angle made available, the application of the invention by being fitted on two (or more) drive units will help provide a more accurate balance between the drive units when these are able to be trimmed independently of one another.

Whilst the invention has been described with reference to a single embodiment, the invention is not limited to said embodiment, but may be varied widely within the scope of the appended claims.

We claim:

1. Trim angle sensor transmission for a marine drive, wherein said transmission has a rotatable input member for transmitting a rotational input, said input member being rotatable between predetermined angular limits corresponding to the trim limits of a marine drive, wherein said input member is connected to an input of a rotational output sensor for detecting an angle of rotation of the input member, said output sensor having electrically rotational limits which are wider than the predetermined angular limits of said input member, said transmission further comprising a planetary gear drive including an annulus, a sun wheel, at least one planet wheel and a planet carrier, wherein said annulus is fixed, said input member is connected to said planet carrier and said sun wheel is connected to said output sensor, said planetary gear drive providing a multiplication of said rotational input from said input member to said output sensor.

2. Trim angle sensor transmission according to claim 1, wherein said annulus is formed internally on a housing member provided with an attachment flange, and wherein a cover having an opening therein is fixedly attached to said housing member, whereby a shaft connected to said planet carrier extends through said opening for fixed connection with said input member.

3. Trim angle sensor transmission according to claim 2, wherein said cover is sealed in a water-tight manner to said housing member and wherein a water-tight seal is provided between said planet carrier and said cover.

4. Trim angle sensor according to claim 1 or claim 2, wherein said sun wheel is connected to said output sensor which is a rotational potentiometer, and wherein said rotational potentiometer operates within angular limits lying between 0° to 300°–360° and is arranged to provide an output signal corresponding to its degree of angular rotation, and wherein the predetermined limits of said input member cover an angular range of up to 65°.

5. Trim angle sensor transmission according to claim 4, wherein connection means are provided for transmitting said output signal to a trim-angle display device.

6. Trim angle sensor transmission according to claim 5, wherein said trim-angle display device is a digital display.

7. Trim angle sensor transmission according to claim 4, wherein said attachment flange is provided with at least one adjustment means for allowing rotation of said annulus housing member between predetermined angular limits so as to allow said potentiometer to be finely adjusted for correctly indicating a value of zero trim angle.

8. Trim angle sensor transmission according to claim 1, wherein said input member is made of hard rubber and is provided with a flat internal surface, and wherein said input member is fitted with an interference fit on to a shaft connected to said planet carrier, said shaft being provided with a corresponding flat surface, so as to substantially eliminate all play between said shaft and said input member.

9. Trim angle sensor transmission according to claim 4, wherein said planetary gear drive has a fixed gear ratio lying between 4:1 and 7:1.

10. Support system for a marine drive propeller unit, wherein support system comprises a generally vertical axis about which said propeller unit can be steered in a generally horizontal plane, and a substantially horizontal axis about which said propeller unit can be tilted in a substantially vertical plane so as to provide trimming of said propeller unit, wherein said horizontal axis comprises a tilt shaft fixed in relation to said propeller unit so that angular tilting movements of said propeller unit invoke corresponding angular movements of said shaft, and wherein a first end of said shaft is fixedly connected to the input member of the trim angle sensor transmission of claim 1.

11. Support system according to claim 10, wherein said support system comprises a steerable yoke for effecting steering movements of said propeller unit and wherein said tilt shaft is supported on bearings within said steerable yoke.

12. Support system according to claim 10, wherein said annulus is formed internally on a housing member provided with an attachment flange, and wherein a cover having an opening therein is fixedly attached to said housing, whereby a shaft connected to said planet carrier extends through said opening for fixed connection with said input member and wherein said cover is sealed in a water-tight manner to said housing member and wherein a water-tight seal is provided between said planet carrier and said cover and wherein said sun wheel is connected to an output sensor which is a rotational potentiometer, and wherein said rotational potentiometer is sealed in a water-tight manner with respect to said housing.

13. Support system according to claim 10, wherein said marine drive is an inboard-outboard drive unit.

14. Support system according to claim 10, wherein said marine drive is an outboard motor unit.

* * * * *